(12) United States Patent
Caillot (10) Patent No.: US 10,040,427 B2
(45) Date of Patent: Aug. 7, 2018

(54) WIPER ARM FITTED WITH A SPRAY NOZZLE

(71) Applicant: Valeo Systèmes d'Essuyage, Le Mesnil Saint Denis (FR)

(72) Inventor: Gérald Caillot, Cernay la Ville (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 33 days.

(21) Appl. No.: 14/988,281

(22) Filed: Jan. 5, 2016

(65) Prior Publication Data

US 2016/0193984 A1 Jul. 7, 2016

(30) Foreign Application Priority Data

Jan. 5, 2015 (FR) ..................................... 15 50013

(51) Int. Cl.
| | |
|---|---|
| *B60S 1/34* | (2006.01) |
| *B60S 1/52* | (2006.01) |
| *B60S 1/38* | (2006.01) |
| *B60S 1/40* | (2006.01) |

(52) U.S. Cl.
CPC ............ *B60S 1/3415* (2013.01); *B60S 1/38* (2013.01); *B60S 1/522* (2013.01); *B60S 1/4038* (2013.01); *B60S 2001/3817* (2013.01)

(58) Field of Classification Search
CPC ...... B60S 1/522; B60S 1/3415; B60S 1/4041; B60S 1/381
USPC ..................................................... 15/250.04
See application file for complete search history.

(56) References Cited

U.S. PATENT DOCUMENTS

| | | | | |
|---|---|---|---|---|
| 3,008,171 A | * | 11/1961 | Kelley ..................... | B60S 1/48 |
| | | | | 15/250.04 |
| 5,301,384 A | | 4/1994 | Perry | |
| 6,292,974 B1 | * | 9/2001 | Merkel ................ | B60S 1/3806 |
| | | | | 15/250.201 |
| 6,449,797 B1 | * | 9/2002 | De Block ............ | B60S 1/3808 |
| | | | | 15/250.201 |
| 8,381,348 B2 | * | 2/2013 | Egner-Walter .......... | B60S 1/381 |
| | | | | 15/250.04 |
| 2003/0182753 A1 | * | 10/2003 | Baseotto ................. | B60S 1/32 |
| | | | | 15/250.32 |

(Continued)

FOREIGN PATENT DOCUMENTS

| | | |
|---|---|---|
| DE | 102012210167 A1 | 12/2013 |
| DE | 102013212397 A1 | 12/2014 |

(Continued)

OTHER PUBLICATIONS

Preliminary Search Report issued in corresponding French Application No. FR1550013, dated Nov. 11, 2015 (2 pages).

*Primary Examiner* — Andrew A Horton
(74) *Attorney, Agent, or Firm* — Osha Liang LLP (57) ABSTRACT

Arm (14) for driving a blade (12) of a wiper (10) of a vehicle, particularly a motor vehicle, comprising an end piece (28) for fixing to the wiper blade, the arm further comprising a spray nozzle (40) for spraying a fluid, such as a washer fluid, characterized in that the spray nozzle is mounted to pivot about a pivot pin which is directly fixed or attached to the said end piece, and in that the said spray nozzle comprises means configured to collaborate with the said blade to cause the spray nozzle to pivot about the said pin.

15 Claims, 5 Drawing Sheets

(56) References Cited

U.S. PATENT DOCUMENTS

| | | | | |
|---|---|---|---|---|
| 2006/0218740 A1* | 10/2006 | Coughlin | .............. | B60S 1/4038 |
| | | | | 15/250.32 |
| 2011/0107541 A1* | 5/2011 | Caillot | .................. | B60S 1/3862 |
| | | | | 15/250.04 |
| 2013/0269140 A1* | 10/2013 | Egner-Walter | ........ | B60S 1/3862 |
| | | | | 15/250.04 |

FOREIGN PATENT DOCUMENTS

| | | |
|---|---|---|
| JP | 2007-196724 A | 8/2007 |
| WO | 2012/152545 A1 | 11/2012 |

\* cited by examiner

WIPER ARM FITTED WITH A SPRAY NOZZLE

The present invention relates to a wiper arm for a vehicle, particularly a motor vehicle, this arm being of the type comprising an end piece bearing a spray nozzle for spraying a fluid such as a washer fluid.

Motor vehicles are conventionally fitted with wipers for wiping the windscreen and preventing the view that the driver has of his surroundings from being disturbed. These wipers generally comprise a drive arm, moving angularly back and forth, and elongate blades which themselves carry blade rubbers made of an elastic material. These blade rubbers rub against the windscreen and remove the water, conducting it away from the field of view of the driver. The blades are produced either, in a conventional version, in the form of articulated frames which hold the blade rubber at a number of discrete points, giving it a curvature that allows it to conform to whatever curvature the windscreen might have or, in a more recent development known as "flat blade" wipers, in the form of a semi-rigid assembly which holds the blade rubber along its entire length using one or more bend-forming backing strips that allow the blade to be pressed firmly against the windscreen without the need to use frames.

In both solutions, the blade is attached to the drive arm by a fixing system comprising a connector and an adapter. The connector is a piece fixed directly to the blade rubber or directly to the flat blade whereas the adapter is an intermediate piece which allows connection and fixing of the connector to the drive arm. These two pieces are joined together by a transverse pin which allows relative rotation thereof, in a plane perpendicular to the windscreen and passing through the arm. The adapter is further configured to be engaged in a yoke-shaped head or end piece of the drive arm.

Wipers may also comprise equipment such as means for spraying washer fluid onto the windscreen. These spray means may be situated on the bonnet, on the scuttle panel or, in a more recent version, on the wipers. It is, for example, known practice to provide such spray means on the wiper blades or even on the drive arms thereof. In such cases, the washer fluid is conveyed to the spray means by pipes fixed to the arms and connected to a pump and to a reservoir which are generally housed under the bonnet of the vehicle.

In the current state of the art, when spray means are provided on a wiper arm they are secured to this arm. The spray means spray the liquid in directions which remain the same regardless of the position of the blade with respect to the arm, and this causes problems. This is because these directions, which are for example optimized for correctly wetting the windscreen when the blade is in the middle of the windscreen, are no longer optimal when the blade is at the sides of the windscreen, leading to excess consumption of washer fluid and poor cleaning of the windscreen.

The present invention proposes an improvement to this technology which is simple, effective and economical.

The present invention relates to an arm for driving a blade of a wiper of a vehicle, particularly a motor vehicle, comprising an end piece for fixing to the wiper blade, the arm further comprising a spray nozzle for spraying a fluid, such as a washer fluid, characterized in that the spray nozzle is mounted to pivot about a pivot pin which is directly fixed or attached to the said end piece, and in that the said spray nozzle comprises means configured to collaborate with the said blade to cause the spray nozzle to pivot about the said pin.

According to the invention, the spray nozzle is mounted so that it can pivot on the arm and it is the blade that causes the spray nozzle to pivot with respect to the arm. The spray nozzle is advantageously mounted directly on the end piece thereby avoiding the costly and complex use of an intermediate connecting piece. The aforementioned problem of the prior art is also avoided because the spray nozzle can now follow the pivoting movements of the blade as it travels across the windscreen of the vehicle. Thus, the directions in which liquid is sprayed can be optimized for effective wetting of the majority of the windscreen.

The arm according to the invention may comprise one or more of the following features, considered in isolation from one another or in combination with one another:

the said pivot pin extends in a direction substantially transverse to a longitudinal axis or axis of elongation of the arm or of the end piece thereof, the said pivot pin is substantially parallel to an axis about which the blade is articulated to the arm, the said pivot pin is substantially aligned with the said axis about which the blade is articulated to the arm, the said pivot pin comprises a shaft of elongate shape of which one longitudinal end is fixed or attached to the end piece, the said shaft has a substantially cylindrical or parallelepipedal shape, the said shaft is formed of one piece with the end piece, the said shaft is produced by cutting and bending a wall of the said end piece, a substantially cylindrical finger is mounted on the said shaft, this finger having for example a longitudinal bore in which the shaft is engaged and which in cross section has a shape that substantially complements that of the shaft, the spray nozzle is mounted directly on the shaft or the finger mounted on the shaft, the said means are configured to collaborate with an element of the said blade, such as a connector, a backing strip or a longitudinal body, the arm bears two spray nozzles, preferably independent ones, the end piece bears two shafts for the pivoting of two spray nozzles, the shafts are coaxial, the spray nozzle is supplied by two hoses, the spray nozzle comprises means for spraying on one side of the arm (or of the blade) or on both sides of the arm (or of the blade) simultaneously or alternately, and the spray nozzle comprises a PTC thermistor element.

The present invention also relates to a wiper for a vehicle, particularly a motor vehicle, comprising a wiper blade and an arm as described hereinabove, the blade comprising a longitudinal body, a blade rubber, at least one backing strip and a system for fixing and articulating the blade to the arm, about a transverse axis, characterized in that the said means of the spray nozzle are configured to collaborate with the blade in such a way that the spray nozzle pivots about the said axis of pivoting and follows the movements of the blade in pivoting about the said transverse axis.

Advantageously, the said means collaborate with an element of the said blade, such as the said at least one backing strip, the said longitudinal body or a connector of the said fixing system.

The said element of the blade comprises a tab, for example in the overall shape of an L, of which one end bears a finger configured to collaborate, for example through engagement, with the said means of the spray nozzle. As an alternative, the said element of the blade comprises a plate for supporting the spray nozzle or means belonging to the spray nozzle. As an alternative, the said element of the blade may comprise a T-shaped slot configured to accommodate the said means belonging to the spray nozzle, which would then have a substantially complementing (in this instance T-shaped) shape. The reverse is also conceivable.

The invention will be better understood and further details, features and advantages of the invention will become apparent from reading the following description given by way of nonlimiting example and made with reference to the attached drawings in which.

It should be noted that the figures explain the invention in detail for implementing the invention, it being of course possible for the said figures to be used better to define the invention if necessary.

In the description that follows, the denominations longitudinal or lateral refer to the orientation of the wiper blade or of the drive arm. The longitudinal direction corresponds to the main axis of the blade or of the arm along which it extends, while the lateral orientations correspond to concurrent straight lines, which means to say straight lines which cross the longitudinal direction, notably at right angles to the longitudinal axis of the blade or of the arm in the plane in which it rotates. For longitudinal directions, the outside and inside denominations are to be assessed in relation to the point at which the blade is fixed to the arm, the inside denomination corresponding to the part in which the arm and a half-blade extend or with respect to the point at which the arm is fixed to the vehicle. Directions referenced as being upper or lower correspond to orientations perpendicular to the plane of rotation of the wiper arm, the denomination lower containing the plane of the windscreen. Finally, the denomination horizontal refers to a plane or the like substantially parallel to the plane of the windscreen and the denomination vertical refers to a plane or the like substantially perpendicular to the plane of the windscreen.

Figure 1:
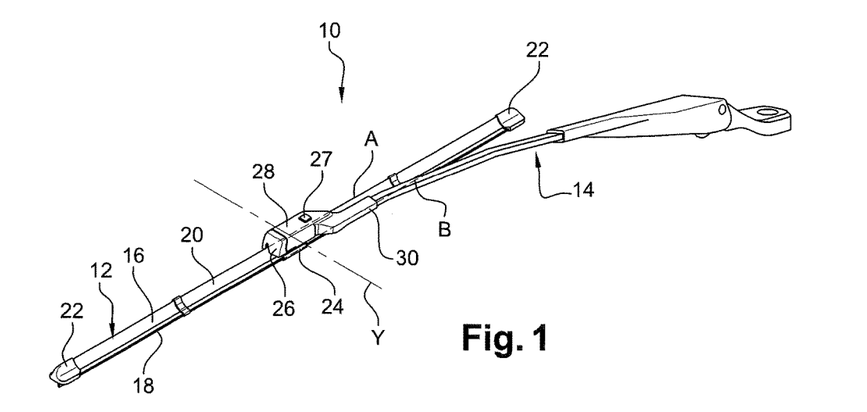
FIG. 1 is a schematic perspective view of a wiper.

FIG. 1 illustrates a wiper 10 notably comprising a blade 12 and an arm 14 for driving the blade 12.

The blade 12 is preferably of the flat blade type and comprises a longitudinal body 16, a blade rubber 18, generally made of rubber, and at least one backing strip (not visible) that stiffens the blade and encourages it to press against a vehicle windscreen.

The body 16 of the blade 12 may comprise an upper aerodynamic deflector 20 intended to improve the operation of the wiping system, the purpose of this deflector being to improve the pressing of the blade against the windscreen and therefore the aerodynamic performance of the wiper.

The blade 12 may further comprise end fittings 22 or clips for attaching the blade rubber 18 and the backing strip to the body 16, these end fittings 22 being situated at each of the longitudinal ends of the body 16.

The blade 12 comprises, substantially at its middle, an intermediate connector 24. An adapter 26 secured to the arm 14 is mounted on the connector 24 so as to maintain a degree of freedom to pivot about an axis of articulation Y which is a transverse axis substantially perpendicular to the longitudinal axis of the blade 12. This degree of freedom allows the blade 12 to pivot with respect to the arm 14 and thus allows the blade to follow the curvature of the windscreen as it moves. The adapter 26 can be detached from the arm 14 by pressing a pushbutton 27 borne by the adapter.

The arm 14 is intended to be driven by a motor to follow a back and forth angular movement that allows water and possibly other undesirable elements with which the windscreen is covered to be removed. The adapter 26 provides the connection of the blade 12 to the arm 14 and, in particular, to a head or end piece 28 of the arm which may be formed as one piece with the arm or attached and fixed thereto.

Figure 2:
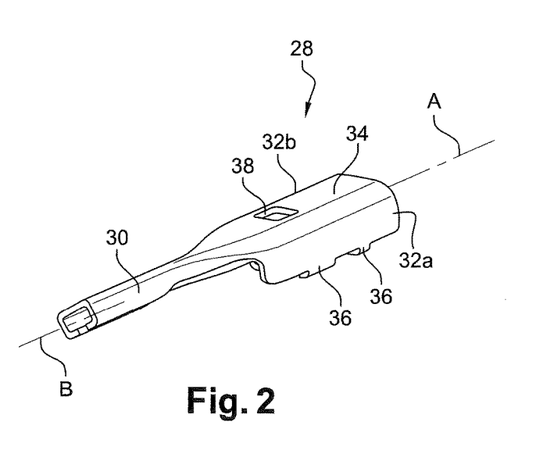
FIG. 2 is a schematic perspective view, on a larger scale, of the end piece of the arm of the wiper of FIG. 1, FIGS. 3a to 3d are perspective partial schematic views of a wiper according to the invention and illustrate steps in the assembly of this wiper.

In the example depicted, the end piece 28 of the arm, best visible in FIG. 2, forms a yoke of substantially U-shaped cross section.

The end piece 28 has an elongate shape of which the axis of elongation A is generally substantially parallel to the axis of elongation or longitudinal axis of the blade 12. The end piece 28 comprises a part 30 for connection to the rest of the arm 14, for example by crimping. This part 30 has an elongate overall shape and extends along an axis B substantially parallel to the axis A and distant from this axis, as best visible in FIGS. 1 and 2. The part 30 is connected to a rear end or inside end of the rest of the end piece 28.

The end piece 28 comprises two lateral longitudinal walls 32a, 32b of which the upper longitudinal edges are joined together by an upper transverse wall 34. The walls 32a, 32b, 34 between them delimit a space housing the adapter 26. The walls 32a, 32b at their lower longitudinal edges comprise means 36 such as hooks for holding the adapter 26 in the aforementioned space.

The upper wall 34 comprises a through-opening 38 of a shape that complements the pushbutton 27. In the mounted position, the pushbutton 27 is housed in this opening 38 and can pass through the latter so as to project onto the upper face of the wall 34. The mounting of the pushbutton 27 in the opening 38 is performed by simple engagement or pushing-together.

According to the invention, the arm 14 and, in particular, the end piece 28 thereof, is equipped with a spray nozzle for spraying fluid, such as a washer fluid. The spray nozzle is mounted so that it can pivot directly on the end piece 28 of the arm 14 and collaborates with the blade 12 to follow the movements thereof about the axis Y.

FIGS. 3a to 3d and 4 depict a first embodiment of the invention.

The spray nozzle 40 may be made from any material and, for example, from a plastics material. It comprises a body 42, for example of parallelepipedal overall shape, and a connecting cannula 44. The body 42 comprises at least one orifice 46 for spraying washer fluid, and in this instance has four of these. The orifices 46 are connected to the cannula 44 by internal pipes which are not visible. The cannula 44 generally comprises a male end fitting intended to engage in one end of a flexible hose 48 of which the other end is connected to a pump and to a reservoir of washer fluid of the vehicle equipped with the wiper. The hose 48 extends partially along the arm 14 and may be fixed to the latter by suitable means.

The spray nozzle 40 may also comprise one or more nonreturn valves, as well as heating means, such as heating wires powered, for example, by electric wires borne by the hose 48.

Figure 3A:
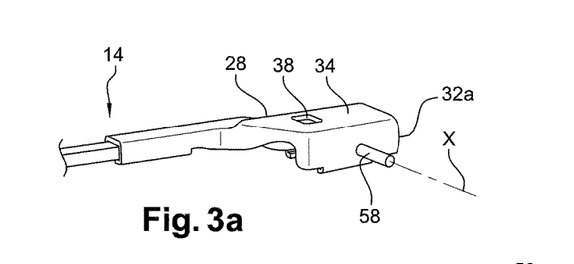
Figure 3B:
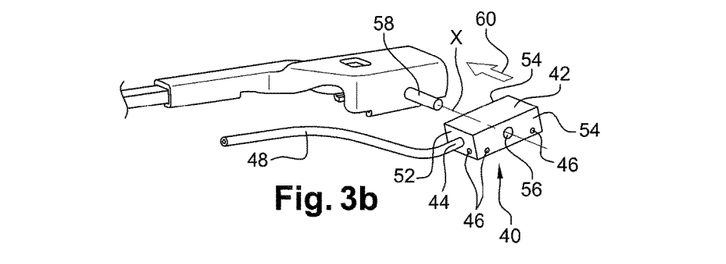
Figure 3C:
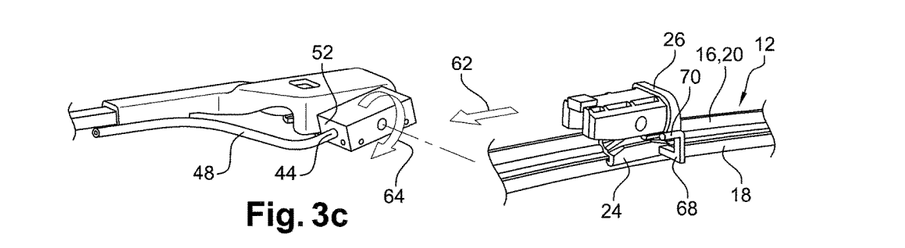
Figure 3D:
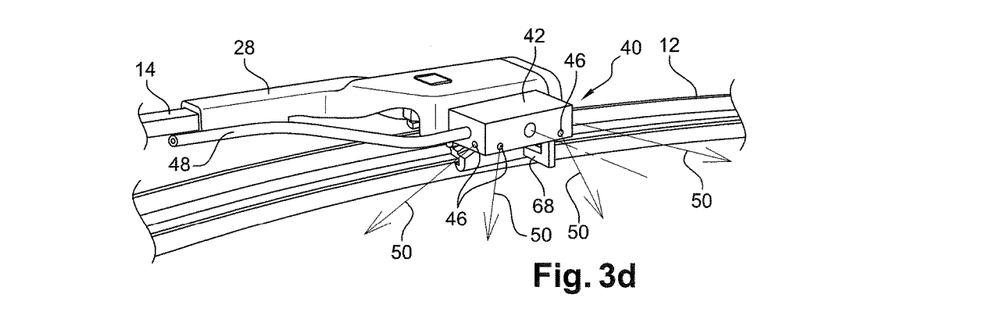

The orifices 46 in this instance are situated on at least one face of the body 42 of the spray nozzle 40. The body of the spray nozzle 40 may, however, have orifices 46 on two or three faces of the spray nozzle, as can be seen in FIG. 3*d*. That allows washer fluid to be sprayed in a number of distinct directions 50 thereby making it possible to define distinct zones in which the liquid impinges on the windscreen of the vehicle.

In the example depicted, the spray nozzle 40 comprises an upper face, a lower face, a front or outside face, a rear or inside face 52 and two lateral faces 54. The lower, upper and lateral faces are substantially parallel to the longitudinal axis of the blade and of the arm and the front and rear faces are substantially perpendicular to this longitudinal axis and therefore substantially parallel to the aforementioned axis Y.

The cannula 44 extends from the face 52 of the spray nozzle. The spray nozzle 40 comprises a transverse orifice 56 to house a pivot shaft 58 which opens onto the two lateral faces 54. The orifice 56 has, in cross section, a circular shape that more or less complements that of the shaft 58.

The shaft 58 is substantially cylindrical and of elongate shape. It extends in the transverse direction from the lateral wall 32*a* of the end piece 28, substantially from the middle of this lateral wall. One end of the shaft 58 is connected to the wall 32*a* and the other end is free. The shaft 58 may be attached and fixed to the end piece 28 by any suitable technique and, for example, by bonding, screwing, welding, brazing, etc. It could potentially be cast into the end piece 28, or equally could be created by pressing, as the end piece 28 (yoke) already is. It is preferably made of metal.

The shaft 58 defines an axis X of pivoting of the spray nozzle 40, which is preferably parallel to the axis Y and more preferably aligned with the axis Y. The shaft 58 is configured to be engaged in the orifice 56 of the spray nozzle so that it can pivot about the shaft, namely about the axis X/Y.

The spray nozzle 40 further comprises means which are configured to collaborate with the blade 12 so as to cause the spray nozzle to pivot with respect to the arm 14 during operation. In the example depicted in FIG. 4 in particular, the spray nozzle 40 comprises a housing 66 which collaborates with a tab 68 borne by the blade to allow this pivoting.

Figure 4:
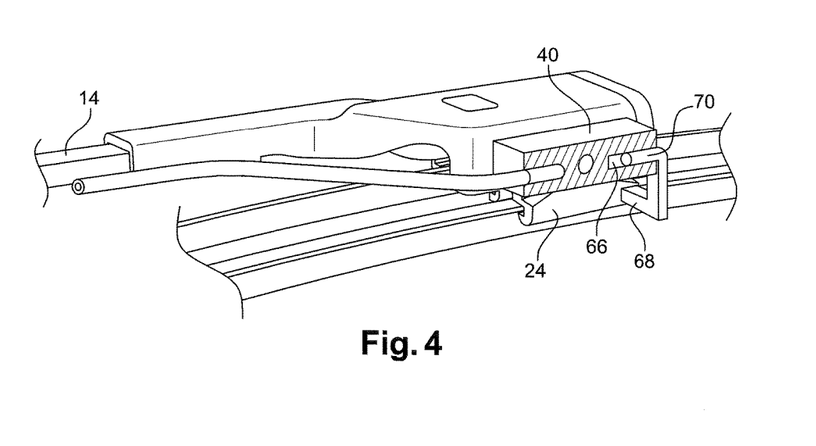
FIG. 4 is another perspective partial schematic view of the wiper of FIGS. 3a-3d with the spray nozzle in longitudinal section.

In the example depicted, the tab 68 comprises a part in the overall shape of an L which extends in a substantially transverse plane. Any solution involving nozzle and blade shapes that complement one another may, however, be envisaged: T-shaped tab intended to collaborate with a T-shaped slot, dovetail, etc.

The tab 68 comprises two substantially perpendicular branches of which one is substantially parallel to the axis Y and of which the other is substantially perpendicular to this axis Y.

The branch of the tab 68, parallel to the axis Y, comprises a longitudinal end here connected to the connector 24 of the blade 12 and an opposite longitudinal end which is connected to a lower end of the other branch of the tab 68 and which therefore extends upwards from the first branch. The opposite end of this other branch is connected to a finger 70 intended to be engaged in the aforementioned housing 66 of the spray nozzle 40.

The tab 68 is situated in the vicinity of one longitudinal end of the connector 24. The finger 70 is substantially parallel to the longitudinal axis of the blade or of the arm and extends on the side of the opposite end of the connector 24. The finger 70 preferably has a shape that substantially complements that of the housing 66 of the spray nozzle 40.

The spray nozzle 40 according to the invention may be mounted in the following way depicted in FIGS. 3*a* to 3*d*. Before the blade 12 is fixed to the arm 14, the spray nozzle 40 is placed on the side of the end piece 28 comprising the shaft 58 and the orifice 56 of the spray nozzle is aligned with the axis X of the shaft 58 (FIGS. 3*a* and 3*b*). The spray nozzle 40 is then moved translationally in the direction of the arrow 60 towards the end piece 28 of the arm until the shaft 58 is engaged in the orifice 56 of the spray nozzle. The blade 12 can then be mounted on the arm, in the known way, by engaging the adapter 26 of the blade in the end piece of the arm for a translational movement in the direction of the arrow 62 until notably the pushbutton 27 of the adapter fits into the opening 38 of the end piece (FIGS. 3*c* and 3*d*) and the finger 70 borne by the tab 66 connected to the connector 24 engages in the housing 66 of the spray nozzle.

In the mounted position depicted in FIG. 3*d*, the spray nozzle 40 is connected both by the shaft 58 to the arm 14 and by the tab 66 and the finger 70 thereof to the blade 12. Engagement of the finger 70 in the housing 66 of the spray nozzle 40 allows the spray nozzle to be connected in terms of rotation to the blade. Thus, as the blade pivots about the axis Y, the spray nozzle pivots about the axis X, aligned with the axis Y, and follows the movements of the blade (arrow 64).

Figure 5:
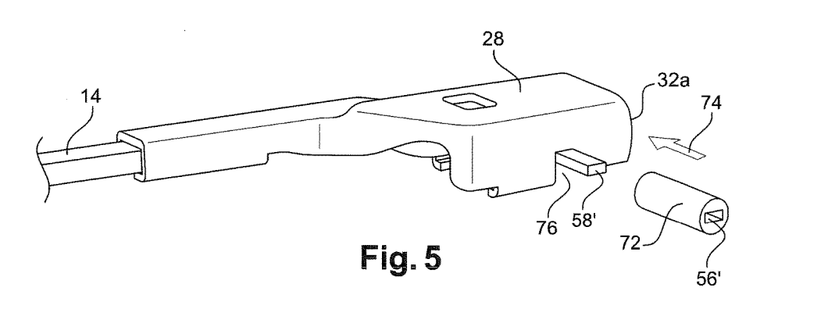
FIG. 5 is a perspective partial schematic view of a wiper arm according to one alternative embodiment of the invention.

FIG. 5 depicts an alternative form of embodiment of the invention in which the spray nozzle is not depicted because it is substantially identical to the one described in the foregoing.

In the alternative form depicted, the elements already described in the foregoing are denoted by the same reference numerals.

The shaft 58' of the arm 14 is of substantially parallelepipedal and elongated overall shape. It extends in the transverse direction from the lateral wall 32*a* of the end piece 28 substantially from the middle of this lateral wall. One end of the shaft 58' is connected to the wall 32*a* and the other end is free.

The shaft 58' is produced here in a single piece with the end piece 28. For that, the lateral wall 32*a* may be cut (cutout 76) and the cut part may be bent and folded to extend in the transverse direction and form the shaft 58'.

The shaft 58' is configured to be engaged in a bore 56' belonging to a peg 72 of elongate cylindrical shape which is itself configured to be engaged in a transverse orifice of the spray nozzle. The orifice of the spray nozzle will be able to be similar to that 56 described in the foregoing, possibly with a diameter greater than that of the orifice 56.

The bore 56' of the peg has a shape that complements the shaft 58' so that the peg is secured, particularly in terms of rotation, with respect to the shaft. The peg 72 defines the aforementioned axis X of pivoting of the spray nozzle, which is preferably parallel to the axis Y and more preferably aligned with the axis Y.

As depicted by the arrow 74 in FIG. 5, the peg 72 is mounted on the shaft 58' by translational movement in the transverse direction. The steps described hereinabove with reference to FIGS. 3*a* to 3*d* can then be performed in order to mount the spray nozzle on the arm and the blade on the arm.

FIGS. 6a to 6d depict another alternative form of embodiment in which the elements already described in the foregoing are denoted by the same reference numerals.

The spray nozzle 40 is substantially identical to the one described in the foregoing and is connected to a washer fluid supply hose even though the latter has not been depicted in the drawings.

The aforementioned means belonging to the spray nozzle 40, which are intended to collaborate with the blade 12 in order to cause the spray nozzle to pivot with respect to the arm 14 during operation, are formed in this instance by the lower part of the spray nozzle and, more exactly, lower face thereof. The spray nozzle 40 rests via its lower face on a plate 68' borne by the blade so as to allow this pivoting.

The plate 68' is substantially planar and extends in a plane substantially parallel to the axes Y and A (or B). It extends on one side of the blade and is, for example, borne by the connector 24 of the blade 12.

The plate 68' may have dimensions such that it extends over substantially the entire extent of the lower face of the spray nozzle, as can be seen in the drawings.

The spray nozzle 40 is mounted on the arm 14 in the way described in the foregoing with reference to FIGS. 3a and 3b.

Figures 6A, 6B:
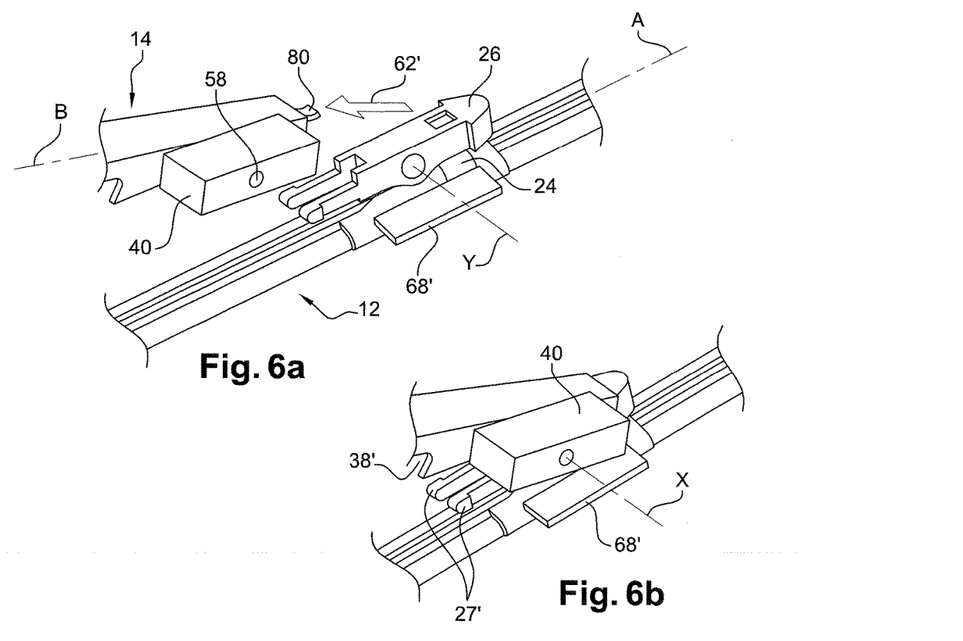
FIGS. 6a to 6d are perspective partial schematic views of another alternative form of embodiment of the wiper according to the invention, and illustrating steps in the assembly of this wiper.

The blade 12 may then be mounted on the arm 14 in another known way, by engaging the adapter 26 of the blade in the end piece of the arm through a translational movement in the direction of the arrow 62' until a front tongue 80 of the end piece 28 of the arm 14 engages in a corresponding housing of the adapter 26 (FIGS. 6a and 6b).

Figures 6C, 6D:
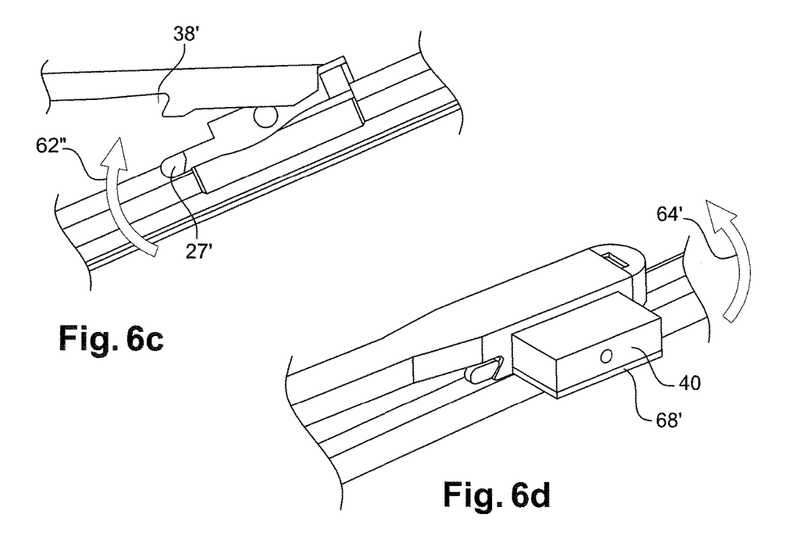

The blade 12 is then moved towards the arm in the direction of the arrow 62" until lateral push-buttons 27' of the adapter engage in notches 38' of the end piece 28 (FIGS. 6c and 6d).

In the mounted position depicted in FIG. 6d, the spray nozzle 40 is pressing against the plate 68' of the blade and can follow the movements of the blade about the axis Y by rotating about the shaft 58 of the end piece 28 of the arm (arrow 64').

Figure 7:
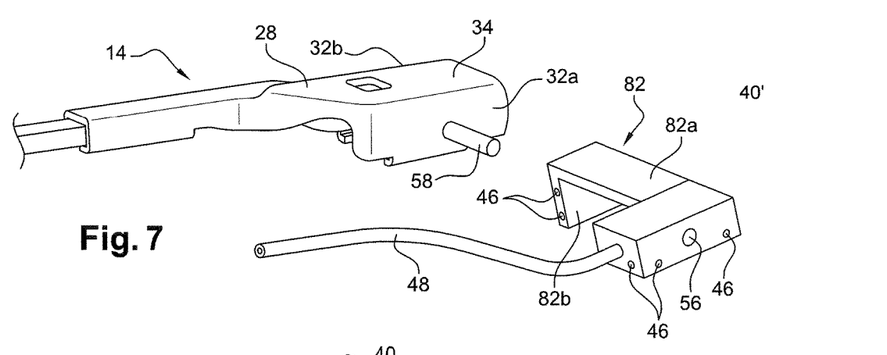
FIGS. 7 to 9 are perspective partial schematic views of a wiper arm according to other alternative forms of embodiment of the invention.

FIG. 7 depicts an alternative form of embodiment of the invention in which the spray nozzle 40' comprises all the features of the spray nozzle 40 described with reference to FIGS. 3a to 4 and also comprises an L-shaped tab 82.

This tab 82 comprises a planar first wall 82a which extends on one side of the spray nozzle and is substantially parallel to and aligned with the upper face of the spray nozzle. This first wall 82a is intended to extend above the end piece 28 and cap same. As an alternative it could extend underneath the piece 28 or forward thereof.

The tab 82 comprises a planar second wall 82b which extends downwards from the free lateral end of the first wall 82a, opposite the body of the spray nozzle 40'. The walls 82a, 82b are substantially perpendicular and the wall 82b may extend parallel to the lateral wall 32b of the end piece 28. The distance between the wall 82b and the body of the spray nozzle 40' is advantageously great enough to allow the shaft 58 to be inserted into the orifice 56 as indicated in the foregoing. This distance is preferably at least equal to the sum of the length of the shaft 58 and of the width of the end piece 28 (namely the distance between the lateral walls 32a, 32b thereof).

As can be seen in the drawing, the wall 82b advantageously comprises washer fluid spray orifices 46. The tab 82 comprises at least one internal duct for the fluidic connection of its orifices 46 with the internal pipes of the body of the spray nozzle 40'.

This then provides fluid spraying means on each side of the end piece 28, that can spray simultaneously towards the front and towards the rear of the wiper, whether this is while the wiper is travelling upwards or downwards.

Figure 8:
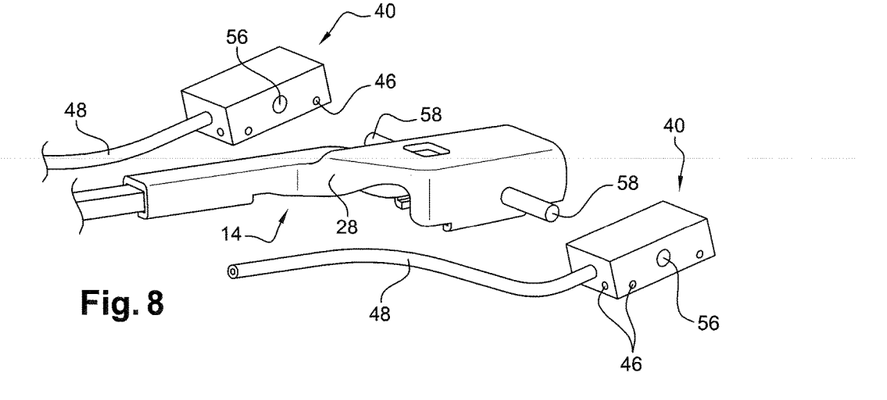

In the alternative form depicted in FIG. 8, the arm 14 bears two independent and substantially identical spray nozzles 40 of the kind depicted in FIGS. 3a to 4. Each spray nozzle 40 is supplied independently by its own hose 48. The arm 14 therefore in this case comprises two spray nozzle supply hoses 48. The shafts 58 for the pivoting of the spray nozzles 40 are substantially coaxial. Each spray nozzle 40 can rotate with respect to the end piece 28 of the arm about its own axis of rotation and independently of the other spray nozzle.

The advantage of this alternative form is that it, like the alternative form in FIG. 7, allows liquid to be sprayed on both sides of the blade during operation. By contrast, because each spray nozzle is supplied independently with fluid, the fluid can be sprayed alternately, always towards the front, namely on one side when the blade is moving upwards and on the other side when the blade is moving downwards.

Figure 9:
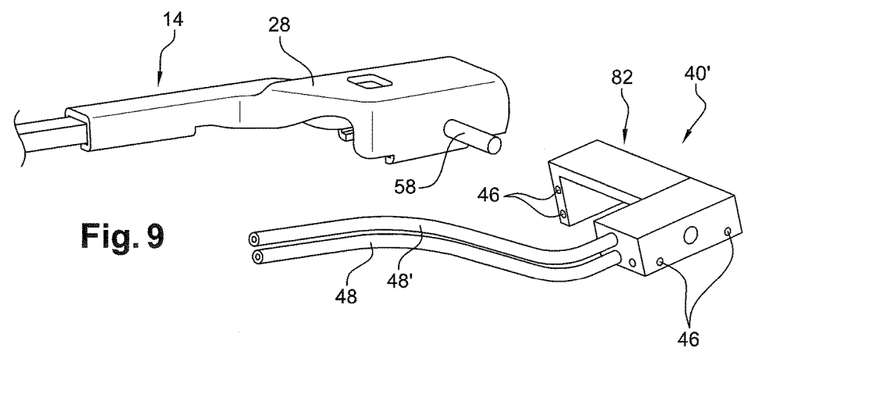

FIG. 9 depicts an alternative form of embodiment of the invention in which the spray nozzle 40' differs from that of FIG. 4 essentially in that it is connected to two hoses 48, 48' rather than just one. A first hose 48 supplies the orifices 46 of the body of the spray nozzle 40' and the second hose 48' supplies the orifices 46 of the tab 82. This technology thus makes it possible to enjoy the advantages of the two alternative forms of FIGS. 7 and 8, namely the use of a single spray nozzle (FIG. 7) with the alternating spraying of liquid on one side of the blade or the other during operation (FIG. 8).

The invention claimed is:

1. An arm for driving a wiper blade of a wiper of a motor vehicle, comprising:
    an end piece for fixing to the wiper blade; and
    a spray nozzle for spraying a fluid,
    wherein the spray nozzle is formed by a substantially parallelepipedal body, different from the wiper blade, and
    wherein the spray nozzle is mounted to the end piece using a pivot pin which is directly fixed or attached to the end piece, thereby enabling the spray nozzle to pivot on the arm, separately from the wiper blade, and
    wherein the entire substantially parallelepipedal body that forms the spray nozzle is located external to the end piece.

2. The arm according to claim 1, in which the pivot pin extends in a direction substantially transverse to a longitudinal axis or axis of elongation of the arm or of the end piece thereof.

3. The arm according to claim 1, in which the pivot pin is substantially parallel to an axis about which the wiper blade is articulated to the arm.

4. The arm according to claim 3, in which the pivot pin is substantially aligned with the axis about which the wiper blade is articulated to the arm.

5. The arm according to claim 1, in which the pivot pin comprises a shaft of elongate shape of which one longitudinal end is fixed or attached to the end piece.

6. The arm according to claim 5, in which the shaft has a substantially cylindrical or parallelepipedal shape.

7. The arm according to claim 5, in which the shaft is formed of one piece with the end piece.

8. The arm according to claim 7, in which the shaft is produced by cutting and bending a wall of the end piece.

9. The arm according to claim 5, in which a substantially cylindrical peg is mounted on the shaft, this peg having a longitudinal bore in which the shaft is engaged and which in cross section has a shape that substantially complements that of the shaft.

10. The arm according to claim 9, in which the spray nozzle is mounted directly on the shaft or the peg mounted on the shaft.

11. The arm according to claim 1, in which means of the spray nozzle are configured to collaborate with an element of the wiper blade, the element comprising one selected from the group consisting of a connector, a backing strip and a longitudinal body.

12. The wiper, comprising the wiper blade and the arm according to claim 1, the wiper blade comprising:
   a longitudinal body;
   a blade rubber;
   at least one backing strip; and
   a system for fixing and articulating the wiper blade to the arm, about a transverse axis,
   wherein means of the spray nozzle are configured to collaborate with the wiper blade in such a way that the spray nozzle pivots about an axis of pivoting and follows the movements of the wiper blade in pivoting about the transverse axis.

13. The wiper according to claim 12, in which the means collaborate with an element of the wiper blade, such as the at least one backing strip, the longitudinal body or a connector of the fixing system.

14. The wiper according to claim 13, in which the element of the wiper blade comprises a tab in the overall shape of an L, of which one end bears a finger configured to collaborate through engagement, with the means of the spray nozzle.

15. The wiper according to claim 13, in which the element of the blade comprises a plate for supporting the spray nozzle or means belonging to the spray nozzle.

* * * * *